United States Patent
Benning et al.

(10) Patent No.: US 10,132,824 B2
(45) Date of Patent: Nov. 20, 2018

(54) AIR DATA SENSING PROBE WITH ICING CONDITION DETECTOR

(71) Applicant: Rosemount Aerospace, Inc., Burnsville, MN (US)

(72) Inventors: Kevin Benning, Lakeville, MN (US); Weston Daniel Clarence Heuer, Maple Grove, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/625,323

(22) Filed: Jun. 16, 2017

(65) Prior Publication Data

US 2017/0370960 A1    Dec. 28, 2017

Related U.S. Application Data

(60) Provisional application No. 62/355,563, filed on Jun. 28, 2016.

(51) Int. Cl.
  *G01P 5/165*   (2006.01)
  *G01K 13/02*   (2006.01)
  *B64D 15/20*   (2006.01)

(52) U.S. Cl.
  CPC .............. *G01P 5/165* (2013.01); *B64D 15/20* (2013.01); *G01K 13/028* (2013.01)

(58) Field of Classification Search
  CPC .. G01F 1/46; G01K 13/02; G01K 1/08; G01P 13/02
  See application file for complete search history.

(56) References Cited

U.S. PATENT DOCUMENTS

| | | | | |
|---|---|---|---|---|
| 4,096,744 A * | 6/1978 | De Leo | .................... | G01C 5/06 73/180 |
| 4,333,004 A | 6/1982 | Forgue et al. | | |
| 5,601,254 A * | 2/1997 | Ortiz | ........................ | G01F 1/46 244/1 R |
| 6,271,769 B1 * | 8/2001 | Frantz | ................... | G01P 13/025 340/963 |
| 6,430,996 B1 * | 8/2002 | Anderson | .............. | B64D 15/20 73/170.26 |

(Continued)

FOREIGN PATENT DOCUMENTS

| | | |
|---|---|---|
| EP | 1422137 A1 | 5/2004 |
| EP | 2428447 A2 | 3/2012 |
| WO | WO03002410 A1 | 1/2003 |

OTHER PUBLICATIONS

Extended European Search Report for European Patent Application No. 17173396.7, dated Jul. 31, 2017, 8 pages.

*Primary Examiner* — Jewel V Dowtin
(74) *Attorney, Agent, or Firm* — Kinney & Lange, P.A.

(57) ABSTRACT

A system includes a device having a first surface configured to be exposed to airflow about an exterior of an aircraft, the device including a first self-compensating heater configured to heat the first surface, a first current monitor configured to sense a first measurement value representing electrical current flow through the first self-compensating heater, one or more processors, and computer-readable memory encoded with instructions that, when executed by the one or more processors, cause the system to receive aircraft flight condition data and produce an icing condition signal based upon the first measurement value and the aircraft flight condition data.

20 Claims, 7 Drawing Sheets

(56) References Cited

U.S. PATENT DOCUMENTS

| | | |
|---|---|---|
| 6,452,542 B1 | 9/2002 | Bachinski et al. |
| 6,604,029 B2 | 8/2003 | Cronin et al. |
| 6,651,515 B2 * | 11/2003 | Bernard ................ G01K 13/02 374/E13.006 |
| 6,761,057 B2 | 7/2004 | Cronin et al. |
| 6,847,903 B2 | 1/2005 | Severson et al. |
| 7,014,359 B2 * | 3/2006 | Suga ...................... G01K 13/02 244/134 E |
| 7,490,510 B2 | 2/2009 | Agami et al. |
| 7,643,941 B2 | 1/2010 | Lilie et al. |
| 8,037,750 B2 | 10/2011 | Heuer et al. |
| 8,060,334 B1 | 11/2011 | Jarvinen |
| 8,100,582 B1 * | 1/2012 | Powell ................ G01K 13/028 374/138 |
| 8,348,501 B2 | 1/2013 | Severson |
| 9,201,031 B2 | 12/2015 | Lilie et al. |
| 9,541,429 B2 * | 1/2017 | Farokhi ................ G01P 5/165 |
| 2014/0191084 A1 | 7/2014 | Gambino et al. |

* cited by examiner

AIR DATA SENSING PROBE WITH ICING CONDITION DETECTOR

CROSS-REFERENCE TO RELATED APPLICATION(S)

This application claims the benefit of U.S. Provisional Application No. 62/355,563 filed Jun. 28, 2016 for "AIR DATA SENSING PROBE WITH ICING CONDITION DETECTOR" by K. Benning, and W. Heuer.

BACKGROUND

Air data probe devices are utilized in aerospace applications for measuring environmental parameters usable to determine air data outputs. For instance, air data probes can measure pitot pressure, static pressure, or other parameters of airflow across the air data probe that are usable for determining air data outputs, such as pressure altitude, altitude rate (e.g., vertical speed), airspeed, Mach number, angle of attack, angle of sideslip, or other air data outputs. Such air data probes often include one or more air data sensing ports, such as static pressure ports located on the side of the probe integral to the surface of the probe that are pneumatically connected to pressure sensors (e.g., pressure transducers) that sense the atmospheric pressure outside of the aircraft. Air data probes, via the static pressure ports and corresponding pressure sensors, can provide consistent and accurate pressure measurements that are usable to accurately determine air data outputs over a broad range of aircraft flight envelopes.

Certain flight conditions can lead to the buildup of ice and/or exposure to ice crystals on the aircraft exterior or within aircraft components, such as an air data probe or an engine. The accumulation of ice on the aircraft exterior or ingestion of ice crystals can degrade aircraft and component performance.

SUMMARY

In one embodiment, a system includes a device having a first surface configured to be exposed to airflow about an exterior of an aircraft, the device including a first self-compensating heater configured to heat the first surface, a first current monitor configured to sense a first measurement value representing electrical current flow through the first self-compensating heater, one or more processors, and computer-readable memory encoded with instructions that, when executed by the one or more processors, cause the system to receive aircraft flight condition data and produce an icing condition signal based upon the first measurement value and the aircraft flight condition data.

In another embodiment, a method includes receiving a first measurement value representing electrical current flow through a first self-compensating heater that heats a first surface of a device exposed to airflow about an exterior of an aircraft, receiving aircraft flight condition data, and producing an icing condition signal based upon the first measurement value and the aircraft flight condition data.

DETAILED DESCRIPTION

Figure 1A:
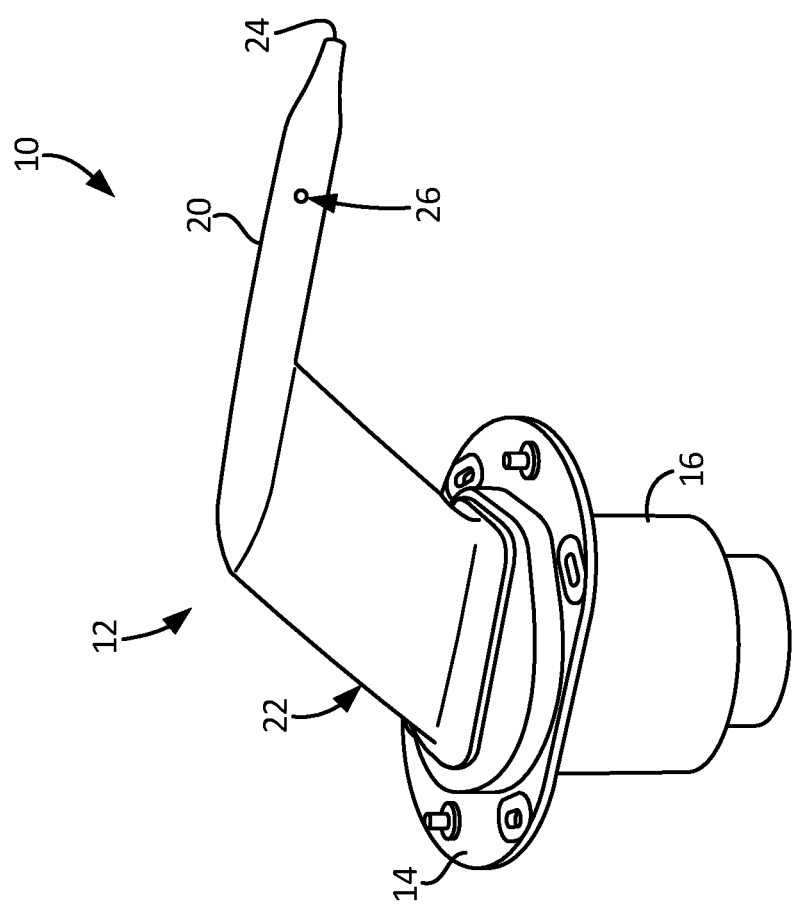
FIG. 1A is an isometric view of an air data system.
Figure 1B:
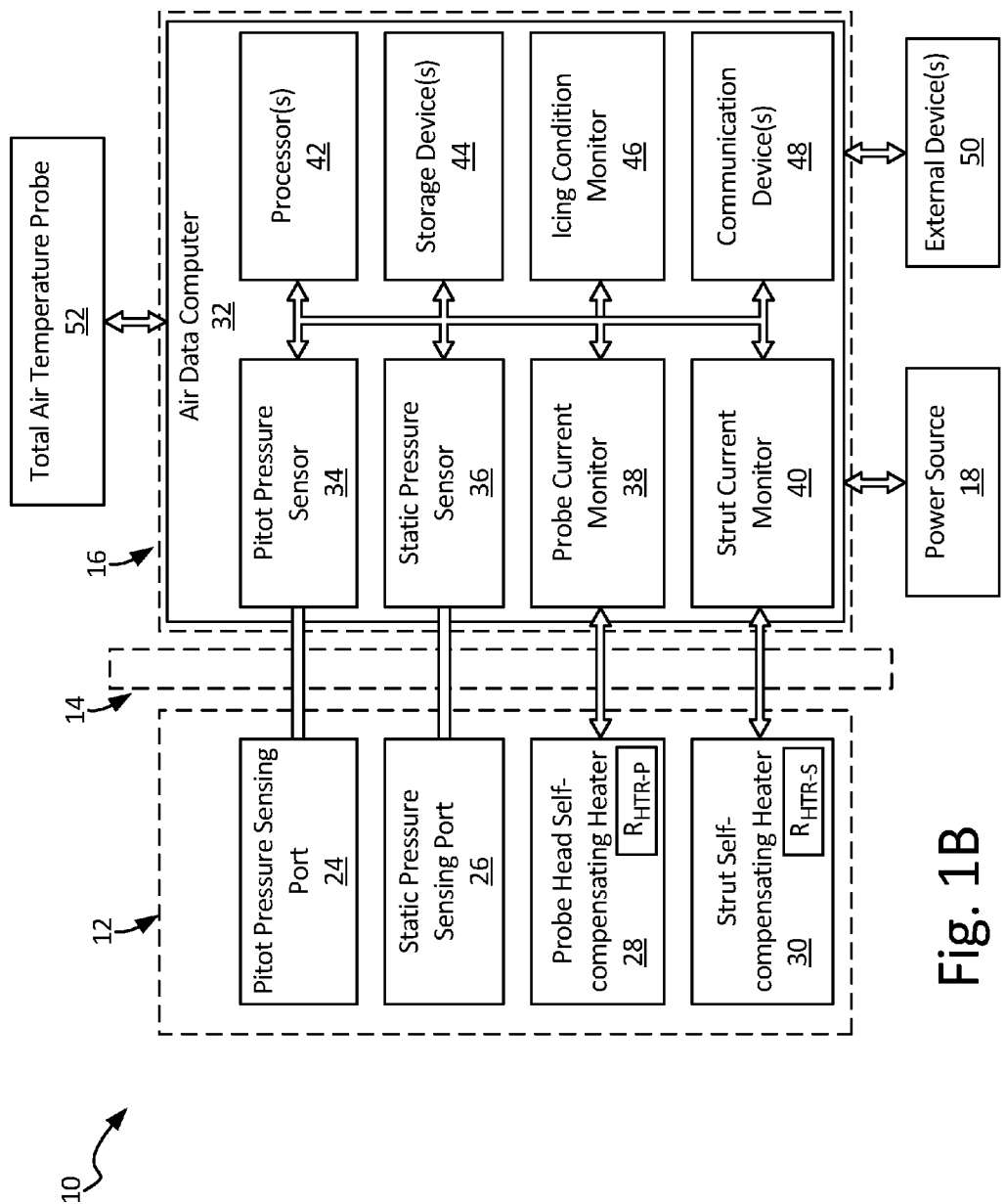
FIG. 1B is a block diagram of the air data system of FIG. 1A.

FIGS. 1A-1B depict air data system 10 and will be discussed together in the following description. FIG. 1A depicts a perspective view of air data system 10. FIG. 1B depicts a block diagram of air data system 10 of FIG. 1A. As illustrated in FIGS. 1A-1B, air data system 10 includes air data probe 12, base mounting plate 14, air data computer housing 16, and power source 18. Air data probe 12 includes probe head 20, strut 22, pitot pressure sensing port 24, static pressure sensing port 26, probe head self-compensating heater 28, and strut self-compensating heater 30. Air data computer housing 16 includes air data computer 32, which includes pitot pressure sensor 34, static pressure sensor 36, probe head current monitor 38, strut current monitor 40, processor(s) 42, storage device(s) 44, icing condition monitor 46, and communication device(s) 48, which communicates with external device(s) 50 and can receive information from total air temperature probe (TAT) probe 52.

Air data probe 12 is connected to base mounting plate 14, which is configured to mount air data probe 12 to an exterior of the aircraft via one or more screws, bolts, rivets, or other attachment devices. Air data computer housing 16 is connected to base mounting plate 14, and is configured to extend within an interior of the aircraft to provide an enclosure for components of air data computer 32. Strut 22 extends between base mounting plate 14 and probe head 20 to position probe head 20 within an oncoming airflow about the exterior of the aircraft. Probe head self-compensating heater 28 and strut self-compensating heater 30 are disposed within probe head 20 and strut 22, respectively. For instance, probe head self-compensating heater 28 and strut self-compensating heater 30 can include wire and/or thin film resistance heating elements integral to or applied to probe head 20 and strut 22, respectively. Pitot pressure sensing port 24 is disposed at a forward tip of probe head 20 to receive ram air during forward movement of the aircraft. Static pressure sensing port 26 is disposed within probe head 20 (e.g., proximate the forward tip of probe head 20) to sense static pressure of air flowing over the exterior of probe head 20. While the example of FIG. 1A illustrates a single static pressure sensing port 26, in other examples, probe head 20 will include more than one static pressure sensing port, such as a second static pressure sensing port opposite static pressure sensing port 26. Probe head self-compensating heater 28 and strut self-compensating heater 30 are electrically connected to power source 18. Probe head self-compensating heater 28 and strut self-compensating heater 30 are operatively (e.g., electrically and/or communicatively) connected to probe head current monitor 38 and strut current monitor 40, respectively. Pitot pressure sensor 34 and static pressure sensor 36 are disposed within air data computer 32 and are pneumatically connected to pressure sensing port 24 and static pressure sensing port 26, respectively. Each of pitot pressure sensor 34, static pressure sensor 36, probe current monitor 38, and strut current monitor 40, processor(s) 42, storage device(s) 44, icing condition monitor 46, and communication device(s) 48 are operatively connected via, e.g., one or more communication channels, such as a data bus, an inter-process communication data structure, or other such communication channel. Air data computer 32 is also operatively connected to external device(s) 50 and TAT probe 52.

Air data system 10 identifies the presence of icing conditions by monitoring the current draw and/or power consumption of the self-compensating heater(s) (e.g., probe head self-compensating heater 28 and strut self-compensating heater 30) and comparing the current draw and/or power consumption to one or more expected current draw and/or power consumption parameters determined based on aircraft flight conditions determined by air data computer 32 and/or received from producing systems (e.g., an inertial reference system) via communication device(s) 48. In response to determining that the monitored current draw and/or power consumption of at least one of the self-compensating heaters exceeds a threshold deviation from one or more of the corresponding expected current draw and/or power consumption parameters, air data system 10 produces a communicable icing condition signal. In addition, air data system 10 can differentiate between the presence of ice crystal and liquid water icing conditions by comparing the respective monitored current draws and/or power consumption measurements of probe head self-compensating heater 28 and strut self-compensating heater 30. While both probe head 20 and strut 22 provide wetted surfaces for the potential accumulation of liquid water, probe head 20 can also ingest ice crystals during flight via pitot pressure sensing port 24. In contrast, ice crystals within an oncoming airflow will have a tendency to deflect off strut 22 without ingestion or appreciable accretion. In response to determining that the monitored current draw and/or power consumption of probe head self-compensating heater 28 exceeds a threshold deviation from the monitored current draw and/or power consumption of strut self-compensating heater 30, air data system 10 can produce an icing condition signal indicating the presence of solid water.

Air data probe 12 can measure pitot pressure, static pressure, or other parameters of airflow that are usable for determining air data outputs, such as pressure altitude, altitude rate (e.g., vertical speed), airspeed, Mach number, angle of attack, angle of sideslip, or other air data outputs. Probe head 20 of air data probe 12 defines a longitudinal axis that extends generally in the direction of forward flight of the aircraft and is configured to ingest air through pitot pressure sensing port 24 and static pressure sensing port 26. Pitot pressure sensing port 24 in the leading end of probe head 20 is configured for sensing pitot pressure (e.g., total pressure), while static pressure sensing port 26 near the leading end of probe head 20 is configured for sensing static pressure (e.g., stagnation pressure) of airflow across probe head 20. Pitot pressure sensing port 24 and static pressure sensing port 26 are pneumatically connected to one or more pressure transducers or other pressure sensors, such as pitot pressure sensor 34 and/or static pressure sensor 36. Outputs of pitot pressure sensor 34 and/or static pressure sensor 36 are electrically connected to a controller or other computing device (e.g., included within an air data system, such as air data computer 32) including one or more processors and computer-readable memory encoded with instructions that, when executed by the one or more processors, cause the controller device to determine one or more air data outputs based on the measured pressure(s) received from pressure sensor 26 and/or static pressure sensor 36 via pitot pressure sensing port 24 and static pressure sensing port 26, respectively. Examples of such air data outputs include, but are not limited to, pressure altitude, altitude rate (e.g., vertical speed), airspeed, Mach number, angle of attack, and angle of sideslip. Probe head 20 also houses probe head self-compensating heater 28. Strut 22 extends between base mounting plate 14 and probe head 20, supports probe head 20 in the stream of airflow passing over the exterior of the aircraft, and also houses strut self-compensating heater 30.

In addition to pitot pressure sensor 34 and static pressure sensor 36, air data probe 12 can include any one or more sensing devices capable of sensing aircraft environmental and/or operating conditions that are usable for generating aircraft flight condition data. In some examples, air data probe 12 can include optical or other sensors capable of measuring aircraft environmental and/or operating conditions related to aircraft flight condition data. In certain examples, air data probe 12 can include an aircraft angle of attack vane or other such sensor configured to rotate and align with a direction of airflow about the exterior of the aircraft to sense an angle of attack of the aircraft. In another example, air data probe 12 can include angle of attack sensing ports and sensors.

Probe head self-compensating heater 28 and strut self-compensating heater 30 are positioned within probe head 20 and strut 22, respectively, for providing anti-icing and/or de-icing of air data probe 12. One or more power sources (e.g., power source 18) continuously supply electrical current to probe head self-compensating heater 28 and strut self-compensating heater 30 during the course of a flight. Power source 18 can be external to or integral to air data computer 32. Electrical power from power source 18 can be routed directly to air data probe 12 or routed through air data computer 32. Each of the self-compensating heaters includes a resistive heating element having a resistance that changes with the surrounding temperature. Probe head self-compensating heater 28 includes heating element $R_{HTR-P}$, and strut self-compensating heater 30 includes heating element $R_{HTR-S}$. As an electrical current is supplied to a self-compensating heater, it will begin to heat up to a given temperature. As the temperature of the self-compensating heater increases, the resistance of the resistive heating element increases and less current is required to maintain or reach the given temperature. When the self-compensating heater is exposed to low temperatures, the resistance of the resistive heating element decreases, and the self-compensating heater draws more current to reach the given temperature. In one example, a self-compensating heater placed in standard air and temperature conditions will draw current and begin heat up to a particular temperature (e.g., 300° C.). As the temperature of the self-compensating heater increases toward the particular temperature, the resistance of the heating element increases and less power is required to maintain that temperature (e.g., 300 watts). If, for example, the same self-compensating heater was instead exposed to a heat sink having a lower temperature (e.g. an ice bath), the heat sink may pull heat away from the self-compensating heater at such a rate that the self-compensating heater may not reach the particular temperature no matter how much current was drawn therein. Under these conditions, the self-compensating heater would not reach the particular temperature and would instead reach a lower temperature (e.g., 150° C.). At this lower temperature, the resistance of the resistive heating element would be comparatively lower than at the standard air temperature and pressure conditions and would in turn draw more power (e.g., 600 watts).

Probe head current monitor 38 and strut current monitor 40 measure the voltage of and the electrical current drawn through the corresponding self-compensating heaters from one or more power sources (e.g., power source 18). The measured current and voltage can be used to determine the power consumption of the self-compensating heaters being monitored. In one example, current monitors 38 and 40 can be positioned at or near self-compensating heaters 28 and 30, respectively, that are being monitored. For instance, probe head current monitor 38 can be located at or near probe head self-compensating heater 28 or, alternatively, in air data computer 32. Strut current monitor 40 can be located at or near strut self-compensating heater 30 or, alternatively, in air data computer 32.

Air data computer 32 includes electrical components, such as one or more processors, computer-readable memory, or other electrical components configured to generate air data outputs corresponding to one or more operational states of an the associated aircraft. Non-limiting examples of such air data outputs include calibrated airspeed, true airspeed, Mach number, altitude (e.g., pressure altitude), angle of attack (i.e., an angle between oncoming airflow or relative wind and a reference line of a wing of the aircraft), vertical speed (e.g., altitude rate), and angle of sideslip (i.e., an angle between a direction of travel and a direction extending through a nose of the aircraft). While illustrated as including single air data computer 32, in other examples, air data system 10 can include two or more air data computers. Similarly, while air data system 10 and air data computer 32 are illustrated in the example of FIGS. 1A and 1B as integrated components, in other examples, air data system 10 and air data computer 32 can be implemented as separated components.

Processor(s) 42 of air data computer 32 can include any one or more of a microprocessor, a controller (e.g., microcontroller), a digital signal processor (DSP), an application specific integrated circuit (ASIC), a field-programmable gate array (FPGA), or other equivalent discrete or integrated logic circuitry. Computer-readable memory of air data system 10 and air data computer 32 can be configured to store information within air data system 10 and air data computer 32 during operation. Such computer-readable memory, in some examples, is described as computer-readable storage device(s). In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, the computer-readable memory is a temporary memory, meaning that a primary purpose of the computer-readable memory is not long-term storage. Computer-readable memory, in some examples, includes and/or is described as volatile memory, meaning that the computer-readable memory does not maintain stored contents when power to air data computer 32 is removed. Examples of volatile memories can include random access memories (RAM), dynamic random access memories (DRAM), static random access memories (SRAM), and other forms of volatile memories. In some examples, computer-readable memory is used to store program instructions for execution by one or more processors of air data computer 32. Computer-readable memory, in one example, is used by software or applications executing on air data computer 32 to temporarily store information during program execution.

Computer-readable memory of air data system 10 and air data computer 32, in some examples, also includes one or more computer-readable storage device(s) 44. Computer-readable storage device(s) 44 can be configured to store larger amounts of information than volatile memory. Computer-readable storage device(s) 44 can be configured for long-term storage of information. In some examples, computer-readable storage device(s) 44 include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Air data computer 32 includes communication device(s) 48. Air data computer 32 utilizes communication device(s) 48 to communicate with external devices via one or more networks, such as one or more wireless or wired networks or both. Communication device(s) 48, in some examples, can include hardware and/or software components configured to communicate via a defined communication protocol, such as the Aeronautical Radio, Incorporated (ARINC) 429 communication protocol or other defined protocols. For instance, air data computer 32 can be communicatively coupled to send and receive data over an aircraft data bus via communication device(s) 48. In certain examples, communication device(s) 48 can be and/or include a network interface card, such as an Ethernet card, an optical transceiver, a radio frequency transceiver, or any other type of device that can send and receive information. Other examples of such network interfaces can include Bluetooth, 3G, 4G, and WiFi radio computing devices as well as Universal Serial Bus (USB). In yet another example, communication device(s) 48 can receive temperature information from TAT probe 52. TAT probe 52 can measure temperature, static temperature, and total air temperature.

Air data computer 32 includes icing condition monitor 46. Icing condition monitor 46 evaluates probe head self-compensating heater 28 and strut self-compensating heater 30 consumption data (e.g., electrical current draw, voltage, and/or power consumption data) against aircraft flight condition data to detect an icing condition whenever the self-compensating heaters draw more current or power than would be expected in dry flight conditions. Aircraft flight condition data can include, but is not limited to, air data parameters (e.g., temperature, pitot pressure, and static pressure) and air data outputs (e.g., calibrated airspeed, true airspeed, Mach number, angle of attack, vertical speed, angle of sideslip, total temperature, and static temperature). The expected current draw through a self-compensating heater is a function of aircraft flight condition data. A signal and/or indication that an icing condition has been detected by icing condition monitor 46 can be communicated (e.g., output) by communication device(s) 48. In another embodiment, an icing condition can be detected by icing condition monitor 46 when the monitored current or power consumption deviates from expected values based on the aircraft flight condition data and surpasses a threshold value. In yet another embodiment, an icing condition can be detected by icing condition monitor 46 based on the rate of change of monitored current or power consumption relative to expected values based on the aircraft flight condition data.

A signal and/or indication that an icing condition has been detected by icing condition monitor 46 can be communicated (e.g., output) by communication device(s) 48 to external device(s) 50. Examples of communicable indications can include, but are not limited to, water content values, data, information, and/or alerts. External device(s) 50 can include any one or more of a processor(s), computer(s), controller(s), communication device(s), display(s), and/or ice protection system(s). In one example, a signal and/or indication that an icing condition has been detected can be communicated by communication device(s) 48 to a pilot of the aircraft. In another example, an indication that an icing condition has been detected can be communicated by communication device(s) 48 to computer that generates a response based on the received signal and/or indication.

In operation, probe head current monitor 38 and strut current monitor 40 monitor the current draw and/or power consumption of probe head self-compensating heater 28 and strut self-compensating heater 30, respectively. The current draw and/or power consumption data of probe head self-compensating heater 28 and strut self-compensating heater 30 can be provided to air data computer 32. Air data computer 32 also receives aircraft flight condition data over an aircraft data bus via communication device(s) 48 or computes aircraft flight condition data from measured or received values using processor(s) 42. Icing condition monitor 46 receives aircraft flight condition data and determines one or more of the expected current draw and/or power consumption parameters for both probe head self-compensating heater 28 and strut self-compensating heater 30 from the aircraft flight condition data. Icing condition monitor 46 monitors and compares the current draw and/or power consumption and the one or more of the expected current draw and/or power consumption parameters of probe head self-compensating heater 28 and strut self-compensating heater 30. In addition, icing condition monitor 46 compares the current draw and/or power consumption of probe head self-compensating heater 28 to strut self-compensating heater 30.

During the course of a flight, air data probe 12 can be exposed to conditions that lead to liquid water formation on probe head 20 and strut 22 or ice accretion in pitot pressure sensing port 24 and/or static pressure sensing port 26 of probe head 20. Where the aircraft enters liquid water icing conditions, probe head self-compensating heater 28 and/or strut self-compensating heater 30 will begin to draw more electrical current, and, once the current draw and/or power consumption exceeds the expected current draw and/or power consumption parameters by a threshold amount, icing condition monitor 46 can produce an icing condition signal indicating the presence of liquid water, which can be communicated by communication device(s) 48 to external device(s). Where the aircraft is exposed to conditions resulting in ice accretion in probe head 20 and the current draw and/or power consumption of probe head current monitor 38 exceeds the current draw and/or power consumption strut current monitor 40, icing condition monitor 46 can produce an icing condition signal indicating the presence of solid water.

The system of implementing the techniques of this disclosure confers the advantage of being able to detect icing conditions and discern between ice crystal and liquid water icing conditions. In addition, the system of implementing the techniques of this disclosure can add functionality to existing air data probes so that an entirely separate icing conditions detector probe is not necessary, thereby saving costs.

Figure 2A:
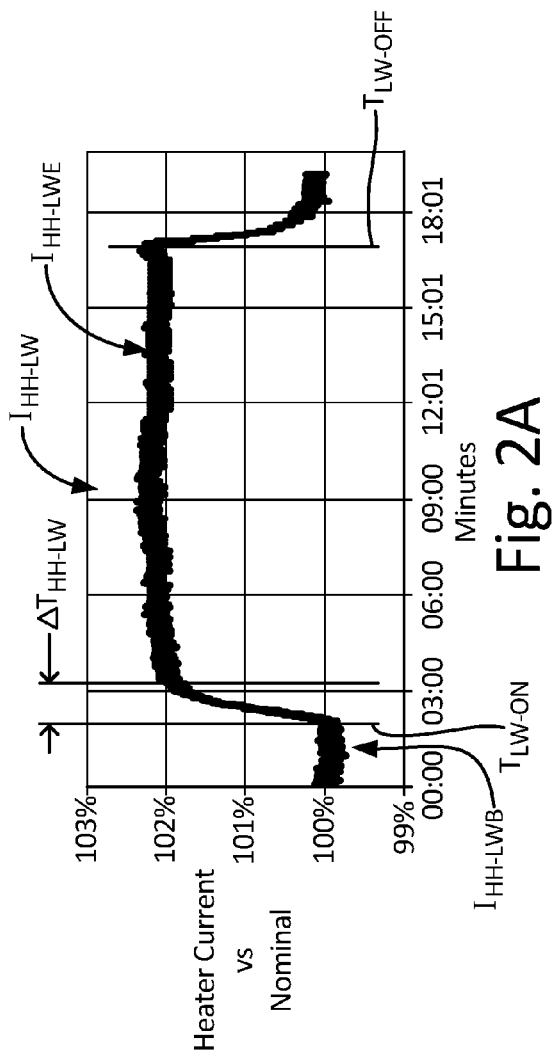
FIG. 2A is a plot showing an electrical current draw of a probe head self-compensating heater in an air data system during low water content conditions.
Figure 2B:
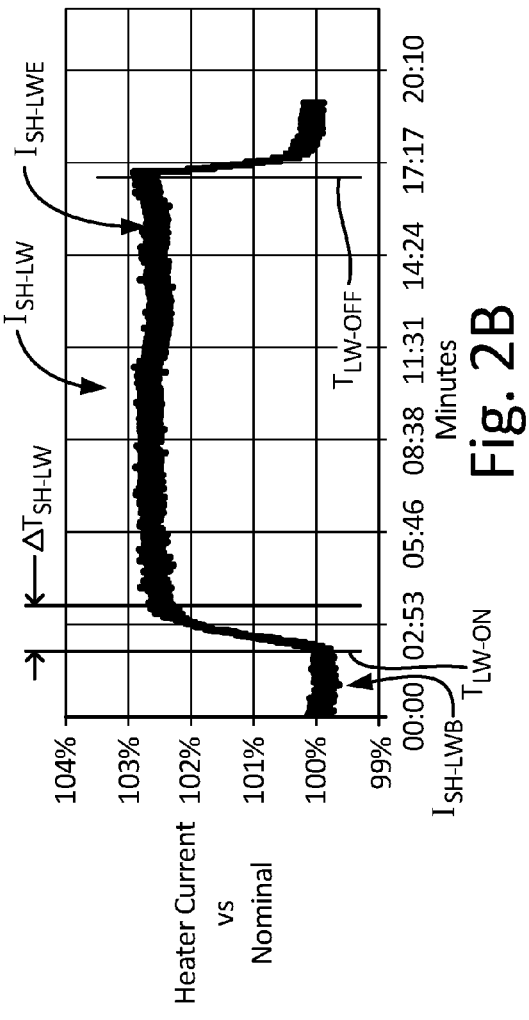
FIG. 2B is a plot showing an electrical current draw of a strut self-compensating heater in a strut section of an air data system during low water content conditions.

FIGS. 2A-2B, 3A-3B, and 4A-4B illustrate normalized electrical current draw data of probe head self-compensating heater 28 and strut self-compensating heater 30 in low water content conditions, high water content conditions, and solid water content conditions, respectively. For FIGS. 2A-2B, 3A-3B, and 4A-4B, the terms "low" and "high" describe relative water content conditions. In general, FIGS. 2A-2B, 3A-3B, and 4A-4B depict the normalized initial current of draw of a given self-compensating heater. At some starting time, the self-compensating heater is exposed to water content at those initial aircraft flight conditions. In response to the water exposure, the self-compensating heater draws more current than it did at the dry initial flight conditions. At some ending time, the water condition is shut off. In response to halting the water exposure, the current draw of the self-compensating heater returns to the current draw at the initial flight conditions. FIGS. 2A-2B illustrate the electrical current draw of probe head self-compensating heater 28 and strut self-compensating heater 30 (shown in FIG. 1), respectively, at low water content aircraft flight conditions and a constant voltage. FIG. 2A is a plot depicting the normalized electrical current draw of probe head self-compensating heater 28 during low water content conditions. FIG. 2B is a plot depicting the normalized electrical current draw of strut self-compensating heater 30 during low water content conditions. FIG. 2A includes probe head self-compensating heater current draw $I_{HH-LW}$ (which includes base current draw $I_{HH-LWB}$ and elevated current draw $I_{HH-LWE}$), the time at which the low water content conditions are turned on $T_{LW-ON}$, the time at which water content conditions are turned off $T_{LW-OFF}$, and the change in time $\Delta T_{HH-LW}$ between the base electrical current draw $I_{HH-LWB}$ and the elevated electrical current draw $I_{HH-LWE}$.

Probe head self-compensating heater 28 (shown in FIG. 1) draws initial base electrical current $I_{HH-LWB}$ at the initial aircraft flight conditions. A non-limiting example of values characterizing an initial aircraft flight condition can include a Mach number of 0.5, a surrounding temperature of −24° C., and/or a −2.5° C. angle of attack. At time $T_{LW-ON}$, probe head 20 is exposed to the low water content. A non-limiting example of a value characterizing a low water icing condition can include a liquid water content of 0.34 g/m$^3$. Exposure to the low water content icing condition decreases the resistance of the resistive heating element $R_{HTR-P}$ of probe head self-compensating heater 28, which in turn causes heater 28 to draw more electrical current than at the initial base conditions. Probe head self-compensating heater current draw $I_{HH-LW}$ reaches elevated electrical current draw $I_{HH-LWE}$ over the time change $\Delta T_{HH-LW}$. At time $T_{LW-OFF}$, the water exposure ceases, and the resistance of the resistive heating element $R_{HTR-P}$ of probe head self-compensating heater 28 returns to the resistance of the initial aircraft flight conditions, such that probe head self-compensating heater current draw $I_{HH-LW}$ draw then returns to base current draw $I_{HH-LWB}$.

FIG. 2B is a plot depicting electrical current draw of strut self-compensating heater 30 during low water content conditions. FIG. 2B includes strut self-compensating heater current draw $I_{SH-LW}$ (which includes the base electrical current $I_{SH-LWB}$ and elevated electrical current draw $I_{SH-LWE}$), the time at which water content conditions are turned on $T_{LW-ON}$, the time at which water content conditions are turned off $T_{LW-OFF}$, and the change in time $\Delta T_{SH-LW}$ between the base current draw $I_{SHB}$ and the elevated current draw $I_{SHE}$.

Strut self-compensating heater 30 (shown in FIG. 1) draws initial base electrical current $I_{SH-LWB}$ at the initial aircraft flight conditions. At time $T_{LW-ON}$, strut 22 is exposed to the low water content. Exposure to the low water content icing condition decreases the resistance of the resistive heating element $R_{HTR-S}$ of strut self-compensating heater 30, which in turn causes heater 30 to draw more current. Strut self-compensating heater current draw $I_{SH-LW}$ reaches elevated electrical current draw $I_{SH-LWE}$ over the time change $\Delta T_{HH-LW}$. At time $T_{LW-OFF}$, the water exposure ceases, and the resistance of the resistive heating element $R_{HTR-S}$ of strut self-compensating heater 30 returns to the resistance of the initial flight conditions absent the low water content exposure, such that strut self-compensating heater current draw $I_{SH-LW}$ then returns to base electrical current $I_{H-LWB}$.

As illustrated by FIG. 2A-2B, both probe head self-compensating heater 28 and strut self-compensating heater 30 exhibited increased current draw when exposed to high water content conditions. By monitoring the current and/or power consumption data in addition to aircraft flight condition data, a system of implementing the techniques of this disclosure determine and signal the presence of low water content icing conditions.

Figure 3A:
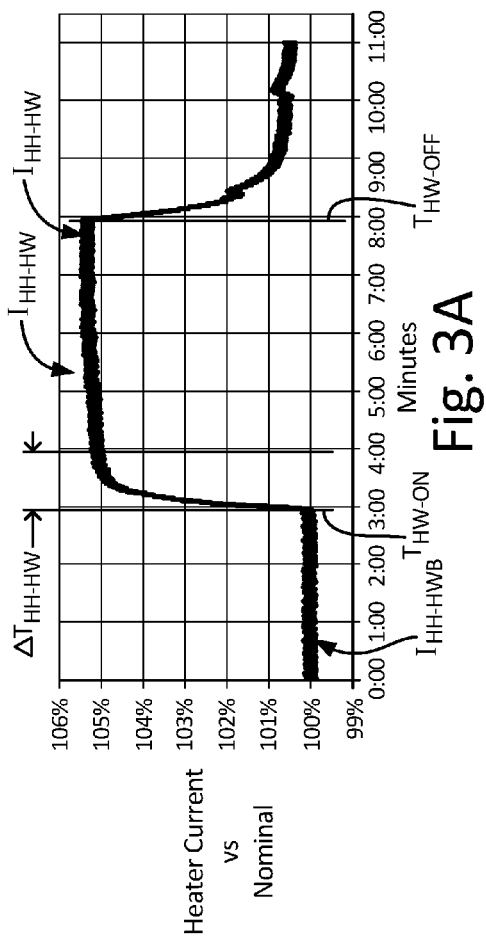
FIG. 3A is a plot showing an electrical current draw of a self-compensating heater in a head section of an air data system during high water content conditions.
Figure 3B:
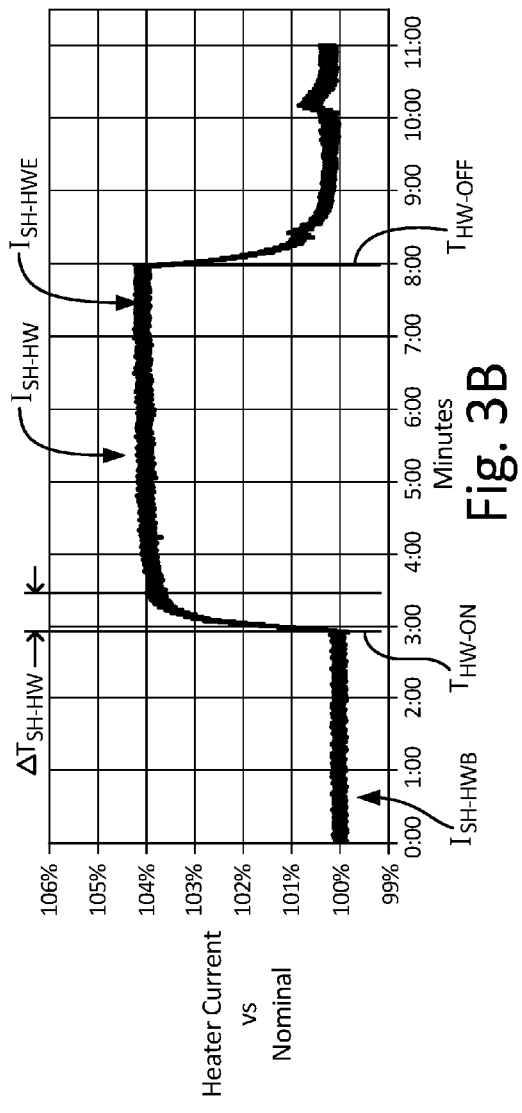
FIG. 3B is a plot showing an electrical current draw of a self-compensating heater in a strut section of an air data system during high water content conditions.

FIGS. 3A-3B illustrate the electrical current draw of probe head self-compensating heater 28 and strut self-compensating heater 30 (shown in FIG. 1), respectively, at high water content aircraft flight conditions and a constant voltage. FIG. 3A is a plot depicting the electrical current draw of probe head self-compensating heater 28 during high water content conditions. FIG. 3B is a plot depicting electrical current draw of strut self-compensating heater 30 during high water content conditions. FIG. 3A includes probe head self-compensating heater current draw $I_{HH-HW}$ (which includes the base current draw $I_{HH-HWB}$ and the elevated current draw $I_{HHE}$), the time at which the high water content conditions are turned on $T_{HW-ON}$, the time at which water content conditions are turned off $T_{HW-OFF}$, and the change in time $\Delta T_{HH-HW}$ between the base electrical current draw $I_{HH-HWB}$ and the elevated electrical current draw $I_{HH-HWE}$.

Probe head self-compensating heater 28 (shown in FIG. 1) draws initial base electrical current $I_{HH-LWB}$ at the initial aircraft flight conditions. A non-limiting example of values characterizing an initial aircraft flight condition can include a Mach number of 0.73, a surrounding temperature of −30° C., and/or a −10° C. angle of attack. At time $T_{HW-ON}$, probe head 20 is exposed to the high water content. A non-limiting example of a value characterizing a high water icing condition can include a liquid water content of 1.65 g/m³. Exposure to the high water content icing condition decreases the resistance of the resistive heating element $R_{HTR-P}$ of probe head self-compensating heater 28, which in turn causes heater 28 to draw more electrical current. Probe head self-compensating heater current draw $I_{HH-HW}$ reaches elevated electrical current draw $I_{HH-HWE}$ over the time change $\Delta T_{HH-HW}$. At time $T_{HW-OFF}$, the water exposure ceases, and the resistance of the resistive heating element $R_{HTR-P}$ of probe head self-compensating heater 28 returns to the resistance of the initial aircraft flight conditions, such that probe head self-compensating heater current draw $I_{HH-HW}$ draw then returns to base current draw $I_{HH-HWB}$.

FIG. 3B is a plot depicting electrical current draw of strut self-compensating heater 30 during high water content conditions. FIG. 3B includes strut self-compensating heater current draw $I_{SH-HW}$ (which includes the base electrical current $I_{SH-HWB}$ and elevated electrical current draw $I_{SH-HWE}$), the time at which water content conditions are turned on $T_{HW-ON}$, the time at which water content conditions are turned off $T_{HW-OFF}$, and the change in time $\Delta T_{SH-HW}$ between the base current draw $I_{SH-HWB}$ and elevated current draw $I_{SH-HWE}$.

Strut self-compensating heater 30 (shown in FIG. 1) draws initial base electrical current $I_{SH-HWB}$ at the initial aircraft flight conditions. At time $T_{HW-ON}$, strut 22 is exposed to the high water content. Exposure to the high water content icing condition decreases the resistance of the resistive heating element within strut self-compensating heater 30, which in turn causes the heater 30 to draw more current than at the initial base conditions. Strut self-compensating heater current draw $I_{SH-HW}$ reaches elevated electrical current draw $I_{SH-HWE}$ over the time change $\Delta T_{HH-HW}$. At time $T_{HW-OFF}$, the water exposure ceases, and the resistance of the resistive heating element $R_{HTR-S}$ of strut self-compensating heater 30 returns to the resistance of the initial flight conditions absent the high water content exposure, such that strut self-compensating heater current draw $I_{SH-HW}$ returns to base electrical current $I_{SH-HWB}$.

As illustrated by FIGS. 3A-3B, both probe head self-compensating heater 28 and strut self-compensating heater 30 exhibited increased current draw when exposed to high water content conditions. By monitoring the current and/or power consumption data in addition to aircraft flight condition data, a system implementing the techniques of this disclosure can determine and signal the presence of high water content icing conditions. Additionally, as illustrated by FIGS. 3A-3B in comparison to FIGS. 2A-2B, the elevated current draw at the high water content conditions is higher than in the low water content conditions. Accordingly, a system implementing the techniques of this disclosure can determine the relative water content between flight conditions.

Figure 4A:
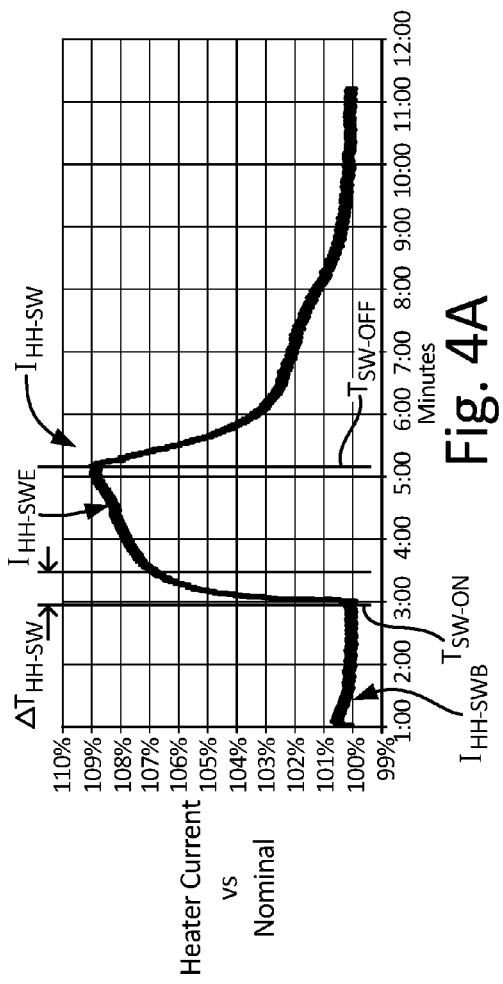
FIG. 4A is a plot showing an electrical current draw of a self-compensating heater in a head section of an air data system during solid water content conditions.
Figure 4B:
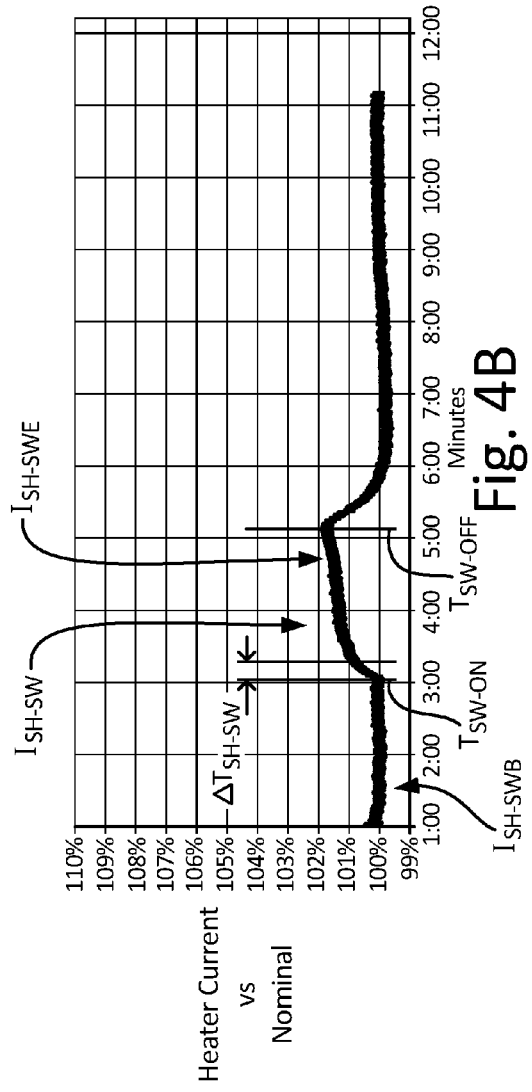
FIG. 4B is a plot showing an electrical current draw of a self-compensating heater in a strut section of an air data system during solid water content conditions.

FIGS. 4A-4B illustrate the electrical current draw of probe head self-compensating heater 28 and strut self-compensating heater 30 (shown in FIG. 1), respectively, at solid water content aircraft flight conditions and a constant voltage. FIG. 4A is a plot depicting the electrical current draw of probe head self-compensating heater 28 during solid water content conditions. FIG. 4A includes probe head self-compensating heater current draw $I_{HH-SW}$ (which includes the base current draw $I_{HH-SWB}$ and the elevated current draw $I_{HH-SWE}$), the time at which the solid water content conditions are turned on $T_{SW-ON}$, the time at which solid water content conditions are turned off $T_{SW-OFF}$, and the change in time $\Delta T_{HH-SW}$ between the base electrical current draw $I_{HH-SWB}$ and the elevated electrical current draw $I_{HH-SWE}$.

Probe head self-compensating heater 28 (shown in FIG. 1) draws initial base electrical current $I_{HH-SWB}$ at the initial aircraft flight conditions. A non-limiting example of values characterizing an initial aircraft flight condition can include a Mach number of 0.73, a surrounding temperature of −30° C., and/or a −10° C. angle of attack. At time $T_{SW-ON}$, probe head 20 is exposed to the solid water content. A non-limiting example of a value characterizing a solid water icing condition can include a liquid water content of 7.1 g/m³. Exposure to the solid water content icing condition decreases the resistance of the resistive heating element $R_{HTR-P}$ of probe head self-compensating heater 28, which in turn causes heater 28 to draw more electrical current than at the initial base conditions. Probe head self-compensating heater current draw $I_{HH-SW}$ reaches elevated electrical current draw $I_{HH-SWE}$ over the time change $\Delta T_{HH-SW}$. At time $T_{SW-OFF}$, the solid water exposure ceases, and the resistance of the resistive heating element $R_{HTR-P}$ of probe head self-compensating heater 28 returns to the resistance of the initial aircraft flight conditions, such that probe head self-compensating heater current draw $I_{HH-SW}$ draw then returns to base current draw $I_{HH-SWB}$.

FIG. 4B is a plot depicting electrical current draw of strut self-compensating heater 30 during solid water content conditions. FIG. 4B includes strut self-compensating heater current draw $I_{SH-HW}$ (which includes the base electrical current $I_{SH-SWB}$ and elevated electrical current draw $I_{SH-SWE}$), the time at which water content conditions are turned on $T_{HW-ON}$, the time at which water content conditions are turned off $T_{SW-OFF}$, and the change in time $\Delta T_{SH-SW}$ between the base current draw $I_{SH-SWB}$ and elevated current draw $I_{SH-SWE}$.

Strut self-compensating heater 30 (shown in FIG. 1) draws initial base electrical current $I_{SH-HWB}$ at the initial aircraft flight conditions. At time $T_{SW-ON}$, strut 22 is exposed to the solid water content. Exposure to the solid water content icing condition decreases the resistance of the resistive heating element $R_{HTR-S}$ of strut self-compensating heater 30, which in turn causes the heater 30 to draw more current than at initial aircraft flight conditions. Strut self-compensating heater current draw $I_{SH-SW}$ reaches elevated electrical current draw $I_{SH-SWE}$ over the time change $\Delta T_{SH-SW}$. At time $T_{SW-OFF}$, the solid water exposure ceases, and the resistance of the resistive heating element $R_{HTR-S}$ of strut self-compensating heater 30 returns to the resistance of the initial flight conditions absent the low water content exposure, such that strut self-compensating heater current draw $I_{SH-SW}$ returns to base electrical current $I_{SH-SWB}$.

As illustrated by FIG. 4A-4B, both probe head self-compensating heater 28 and strut self-compensating heater 30 exhibited increased current draw when exposed to solid water content conditions. Additionally, probe head self-compensating heater 28 exhibited a substantially higher change in electrical current draw than the change in current draw of strut self-compensating heater 30. While both probe head 20 and strut 22 provide wetted surfaces for the potential accumulation of liquid water, probe head 20 can also ingest ice crystals during flight. The substantially higher value of probe head self-compensating heater 28 once exposed to the solid water conditions corresponds to the ingestion of ice crystals. Accordingly, a system of implementing the techniques of this disclosure can discern between ice crystal and liquid water icing conditions.

While the examples of FIGS. 2A-2B, 3A-3B, and 4A-4B have been described with respect to producing an icing conditions signal in response to threshold deviations from expected current and/or power consumptions, techniques of this disclosure are not so limited. For instance, icing condition monitor 46 can determine an amount of liquid water content and/or amount of ice crystals within an airflow about air data probe 12. For example, the amount of the deviation of the current consumption from the expected current consumption can correspond to the amount of liquid water content (a greater deviation corresponding to a larger amount of liquid water content). Similarly, an amount of the deviation of the current and/or power consumption between probe head self-compensating heater 32 and strut self-compensating heater 36 can indicate an amount of ice crystals in the airflow about air data probe 12 (a greater deviation corresponding to a larger amount of liquid water content).

Figure 5:
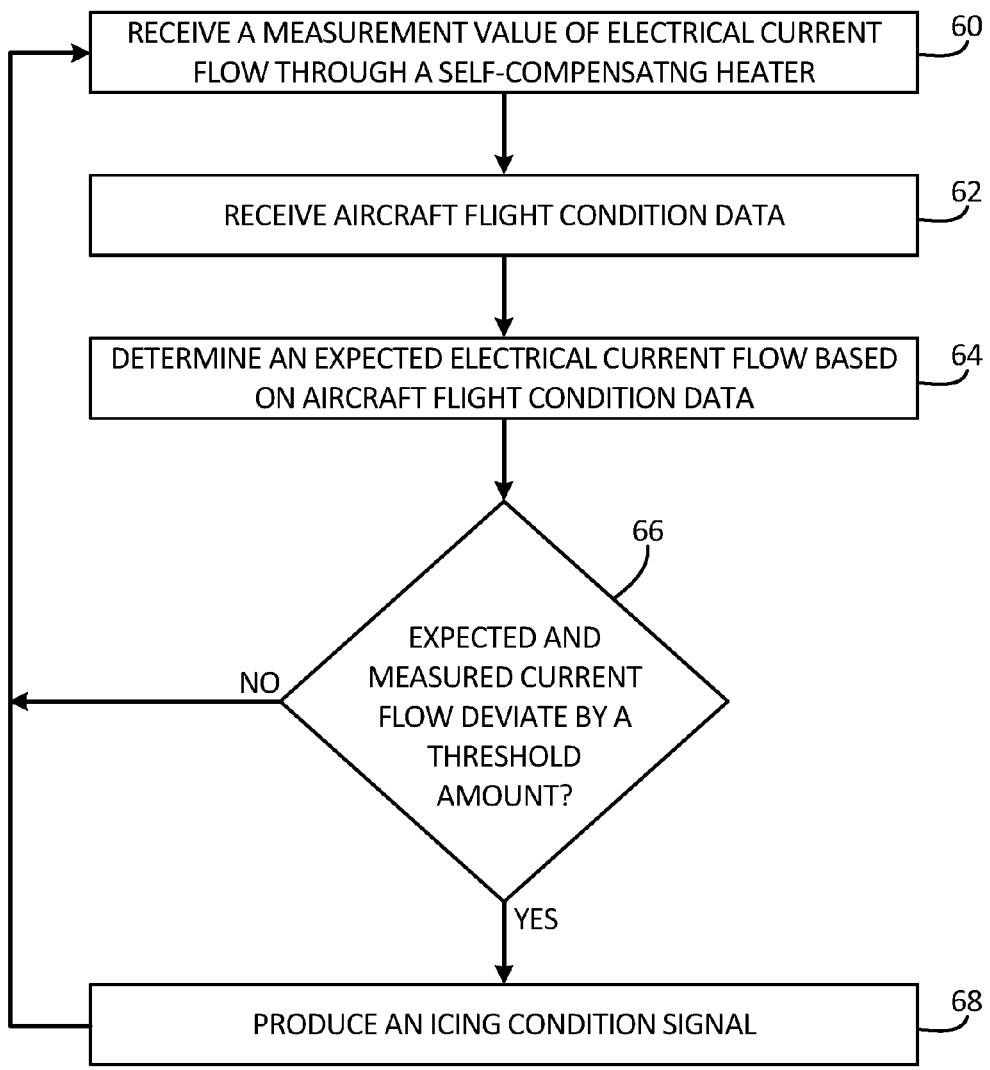
FIG. 5 is a flow diagram illustrating example operations to detect an icing condition and produce an icing signal.
Figure 6:
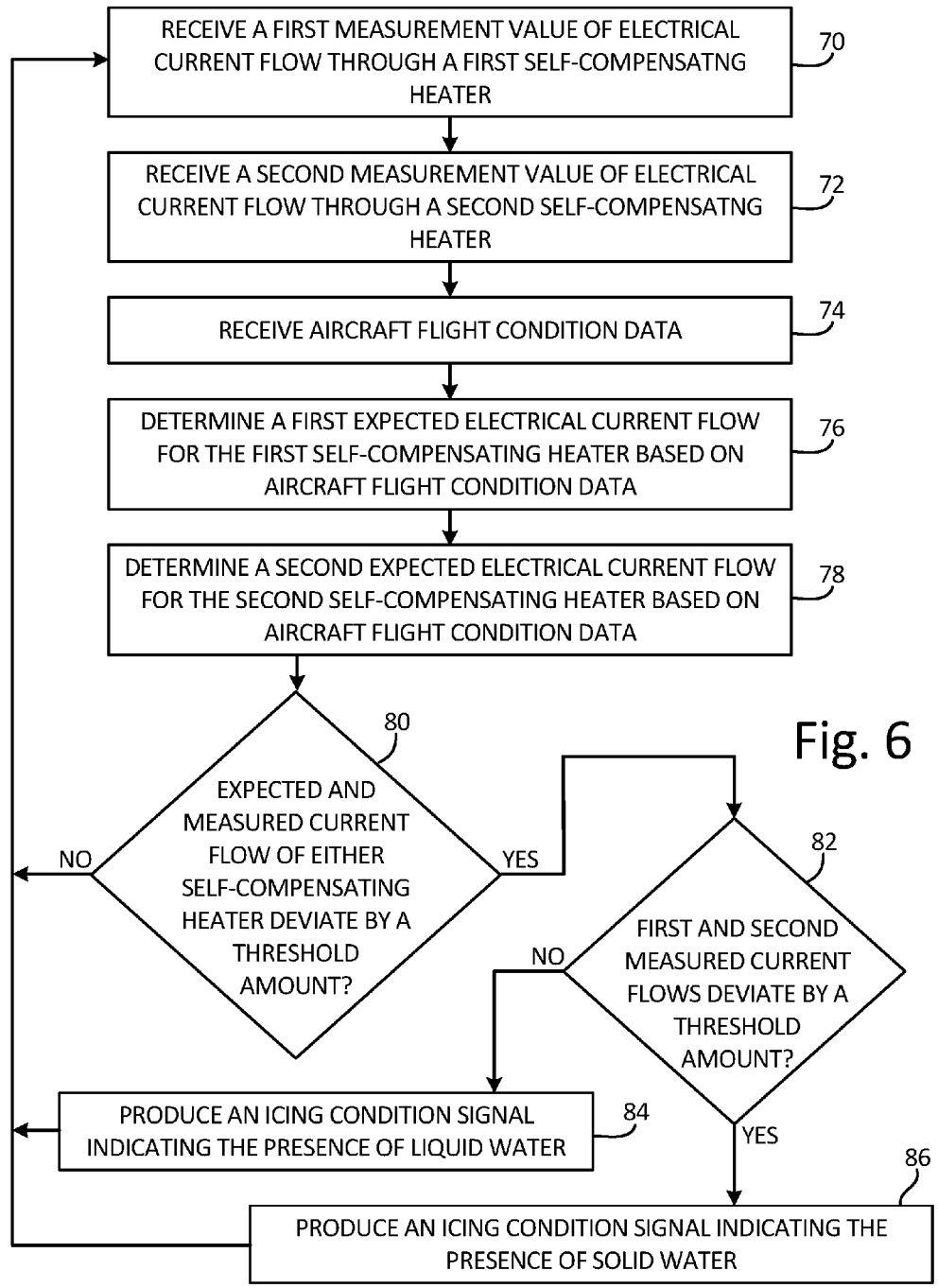
FIG. 6 is a flow diagram illustrating example operations to detect an icing condition and produce an icing signal.

FIGS. 5-6 illustrate example operations to detect an icing condition and produce an icing signal. FIG. 5 is a flow diagram illustrating an operation to produce a liquid water icing condition signal. FIG. 6 is a flow diagram illustrating an operation to produce a liquid water and/or solid water icing condition signal. For the purpose of clarity and discussion, the example operations are described below in the context of air data system 10 of FIG. 1.

As shown in FIG. 5, a measurement value of electrical current flow through a self-compensating heater is received (Step 60). For example, air data computer 32 can receive the electrical current data of probe head self-compensating heater 28 from probe head current monitor 38. Aircraft flight condition data is received (Step 62). For example, aircraft flight condition data can be received from processor(s) 42 or over an aircraft data bus via communication device(s) 48. An expected value of the electrical current draw for the self-compensating heater is determined based on the aircraft flight condition data (Step 64). For instance, icing condition monitor 46 can determine expected electrical current flow for probe head self-compensating heater 28 based on the aircraft flight condition data.

It is determined whether the measured current flow deviates by a threshold amount from the expected current flow based on the aircraft flight condition data (Step 66). For example, icing condition monitor 46 can determine whether the measured current flow deviates by a threshold amount from the expected current flow. In response to determining that the measured current flow does not deviate by a threshold amount from the expected current flow ("NO" branch of step 66), a measurement value of electrical current flow through a self-compensating heater continues to be received. For example, in response to determining that the measured current flow does not deviates by a threshold amount from the expected current flow, air data computer 32 can continue to receive the electrical current data of probe head self-compensating heater 28 from probe head current monitor 38. In response to determining that the measured current flow deviate by a threshold amount from the expected current flow ("YES" branch of step 66), an icing condition signal is produced (step 68). For instance, icing condition monitor 46 can produce an icing condition signal, which can in turn be communicated by communication device(s) 48, indicating the presence of an icing condition. Examples of icing condition signals can include, but are not limited to, water content values, data, information, and/or alerts.

FIG. 6 is a flow diagram illustrating an operation to produce a liquid water and/or solid water icing condition signal. For the purpose of clarity and discussion, the example operations are described below in the context of air data system 10 of FIG. 1.

A first measurement value of electrical current flow through a first self-compensating heater is received (Step 70). For example, air data computer 32 can receive the electrical current data of probe head self-compensating heater 28 from probe head current monitor 38. A second measurement value of electrical current flow through a second self-compensating heater is received (Step 72). For example, air data computer 32 can receive the electrical current data of strut self-compensating heater 30 from strut current monitor 40. Aircraft flight condition data is received (Step 74). For example, aircraft flight condition data can be received from processor(s) 42 or over an aircraft data bus via communication device(s) 48. A first expected value of the electrical current draw for the first self-compensating heater is determined based on the aircraft flight condition data (Step 76). A second expected value of the electrical current draw for the second self-compensating heater is determined based on the aircraft flight condition data (Step 78). For instance, icing condition monitor 46 can determine expected electrical current flow values for probe head self-compensating heater 28 and strut self-compensating heater 30 based on the aircraft flight condition data.

It is determined whether either of the measured current flows deviates by a threshold amount from the corresponding expected current flow based on the aircraft flight condition data (Step 80). For example, icing condition monitor 46 can determine whether either of the measured current flows of probe head self-compensating heater 28 or strut self-compensating heater 30 deviate from the corresponding expected current flows by a threshold amount. In response to determining that neither measured current flow deviates by a threshold amount from the corresponding expected current flows ("NO" branch of step 80), a first measurement value of electrical current flow through a first self-compensating heater continues to be received. For example, in response to determining that neither measured current flow of probe head self-compensating heater 28 nor strut self-compensating heater 30 deviates by a threshold amount from the corresponding expected current flows, air data computer 32 can continue to receive the electrical current data of probe head self-compensating heater 28 from probe head current monitor 38.

In response to determining that either measured current flow deviates by a threshold amount from the corresponding expected current flows ("YES" branch of step 80), it is determined whether the first measured current flow deviates from the second measured current flow by a threshold amount (Step 82). For instance, in response to determining that either measured current flow of probe head self-compensating heater 28 or strut self-compensating heater 30 deviates by a threshold amount from the corresponding expected current flows, icing condition monitor 46 determines whether the first measured current flow deviates from the second measured current flow by a threshold amount. In response to determining the first measured current flow does not deviate from the second measured current flow by a threshold amount ("NO" branch of step 82), an icing condition signal indicating the presence of liquid water is produced (Step 84). For example, in response to determining that the measured current flow of probe head self-compensating heater 28 does not exceed the measured current flow by a threshold amount, icing condition monitor 46 produces an icing condition signal indicating the presence of liquid water. In response to determining the first measured current flow does not deviate from the second measured current flow by a threshold amount ("YES" branch of step 82), an icing condition signal indicating the presence of solid water is produced. For instance, in response to determining that the measured current flow of exceeds the measured current flow of strut self-compensating heater 30 by a threshold amount, icing condition monitor 46 produces an icing condition signal indicating the presence of solid water. Examples of icing condition signals can include, but are not limited to, water content values, data, information, and/or alerts.

As described herein, the system implementing the techniques of this disclosure confers the advantage of being to detect icing conditions and discern between ice crystal and liquid water icing conditions. In addition, the system of implementing the techniques of this disclosure can add functionality to existing aircraft equipment so that an entirely separate icing conditions detector probe is not necessary, thereby saving costs. Alternatively, the functionality can be used in conjunction with an existing ice detector or icing conditions detector probe, such as for added redundancy.

Discussion of Possible Embodiments

The following are non-exclusive descriptions of possible embodiments of the present invention.

A system includes a device having a first surface configured to be exposed to airflow about an exterior of an aircraft, the device including a first self-compensating heater configured to heat the first surface, a first current monitor configured to sense a first measurement value representing electrical current flow through the first self-compensating heater, one or more processors, and computer-readable memory encoded with instructions that, when executed by the one or more processors, cause the system to receive aircraft flight condition data and produce an icing condition signal based upon the first measurement value and the aircraft flight condition data.

The system of the preceding paragraph can optionally include, additionally and/or alternatively, any one or more of the following features, configurations and/or additional components:

The computer-readable memory is further encoded with instructions that, when executed by the one or more processors, cause the system to produce the icing condition signal to include an indication of an amount of liquid water content within the airflow The computer-readable memory is further encoded with instructions that, when executed by the one or more processors, cause the system to determine one or more parameters of expected electrical current flow through the first self-compensating heater based on the received aircraft flight condition data, and determine whether the first measurement value exceeds a first threshold deviation from the one or more parameters of expected electrical current flow.

The computer-readable memory is further encoded with instructions that, when executed by the one or more processors, cause the system to produce the icing condition signal based upon the first measurement value and the aircraft flight condition data responsive to determining that the first measurement value exceeds the first threshold deviation from the one or more parameters of expected electrical current flow.

The device includes a second surface exposed to the airflow about the exterior of the aircraft and a second self-compensating heater configured to heat the second surface comprises a second self-compensating heater, and a the second current monitor is configured to sense a second measurement value representing electrical current flow through the second self-compensating heater, wherein the computer-readable memory is further encoded with instructions that, when executed by the one or more processors, cause the system to determine whether the first measurement value exceeds a second threshold deviation from the second measurement value, produce the icing condition signal to include an indication of a solid water icing condition in response to determining that the first measurement value exceeds the second threshold deviation from the second measurement value, and produce the icing condition signal to include an indication of a solid water icing condition in response to determining that the first measurement value exceeds the second threshold deviation from the second measurement value.

The system includes a second current monitor, wherein the device comprises a second surface exposed to the airflow about the exterior of the aircraft and a second self-compensating heater configured to heat the second surface, wherein the second current monitor is configured to sense a second measurement value representing electrical current flow through the second self-compensating heater, wherein the computer-readable memory is further encoded with instructions that, when executed by the one or more processors, cause the system to determine whether the first measurement value exceeds a second threshold deviation from the second measurement value, produce the icing condition signal to include an indication of a solid water icing condition in response to determining that the first measurement value exceeds the second threshold deviation from the second measurement value, and produce the icing condition signal to include an indication of a solid water icing condition in response to determining that the first measurement value exceeds the second threshold deviation from the second measurement value The one or more parameters of expected electrical current flow through the first self-compensating heater comprise an expected electrical current draw.

The one or more parameters of expected electrical current flow through the first self-compensating heater comprise an expected rate of change of electrical current draw.

The device comprises an air data sensing probe and the first self-compensating heater is disposed in a probe head portion of the air data sensing probe.

The second self-compensating heater is disposed in a strut portion of the air data sensing probe that extends between the probe head portion and a mounting plate configured to mount the air data probe to an aircraft exterior.

The air data sensing probe comprises a total air temperature probe.

One or more communication devices are configured to send and receive data over an aircraft data bus, wherein the computer-readable memory is further encoded with instructions that, when executed by the one or more processors, cause the system to output the icing conditions signal over the aircraft data bus via the one or more communication devices.

A method includes receiving a first measurement value representing electrical current flow through a first self-compensating heater that heats a first surface of a device exposed to airflow about an exterior of an aircraft, receiving aircraft flight condition data, and producing an icing condition signal based upon the first measurement value and the aircraft flight condition data.

The method of the preceding paragraph can optionally include, additionally and/or alternatively, any one or more of the following features, configurations and/or additional components:

Producing the icing condition signal comprises producing the icing condition signal to include an indication of an amount of liquid water content of the airflow about the device.

The method further comprises determining one or more parameters of expected electrical current flow through the first self-compensating heater based on the received aircraft flight condition data, and determining whether the first measurement value exceeds a first threshold deviation from the one or more parameters of expected electrical current flow.

Producing the icing condition signal based upon the first measurement value and the aircraft flight condition data is responsive to determining that the first measurement value exceeds the first threshold deviation from the one or more parameters of expected electrical current flow.

The method further comprises receiving a second measurement value representing electrical current flow through a second self-compensating heater that heats a second surface of the device exposed to the airflow about the exterior of the aircraft.

Determining whether the first measurement value exceeds a second threshold deviation from the second measurement value Producing the icing condition signal comprises producing the icing condition signal to include an indication of a liquid water icing condition in response to determining that the first measurement value does not exceed the second threshold deviation from the second measurement value.

Producing the icing condition signal includes an indication of a solid water icing condition in response to determining that the first measurement value exceeds the second threshold deviation from the second measurement value.

The one or more parameters of expected electrical current flow through the first self-compensating heater comprises an expected electrical current draw.

The one or more parameters of expected electrical current flow through the first self-compensating heater comprises an expected rate of change of electrical current draw.

The first self-compensating heater is disposed in a probe head portion of an air data sensing probe.

The second self-compensating heater is disposed in a strut portion of the air data sensing probe that extends between the probe head portion and a mounting plate configured to mount the air data probe to the aircraft exterior.

The air data sensing probe comprises a total air temperature probe.

The method further comprises outputting the icing conditions signal over an aircraft data bus.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
a device having a first surface configured to be exposed to airflow about an exterior of an aircraft, the device including a first self-compensating heater configured to heat the first surface;
a first current monitor configured to produce a first measurement value representing electrical current flow through the first self-compensating heater;
one or more processors; and
computer-readable memory encoded with instructions that, when executed by the one or more processors, cause the system to:
receive aircraft flight condition data; and
produce an icing condition signal based upon the first measurement value and the aircraft flight condition data.

2. The system of claim 1, wherein the computer-readable memory is further encoded with instructions that, when executed by the one or more processors, cause the system to produce the icing condition signal to include an indication of an amount of liquid water content within the airflow.

3. The system of claim 1, wherein the computer-readable memory is further encoded with instructions that, when executed by the one or more processors, cause the system to:
  determine one or more parameters of expected electrical current flow through the first self-compensating heater based on the received aircraft flight condition data; and
  determine whether the first measurement value exceeds a first threshold deviation from the one or more parameters of expected electrical current flow,
  wherein the computer-readable memory is further encoded with instructions that, when executed by the one or more processors, cause the system to produce the icing condition signal based upon the first measurement value and the aircraft flight condition data responsive to determining that the first measurement value exceeds the first threshold deviation from the one or more parameters of expected electrical current flow.

4. The system of claim 3, further comprising:
  a second current monitor;
  wherein the device comprises a second surface exposed to the airflow about the exterior of the aircraft and a second self-compensating heater configured to heat the second surface;
  wherein the second current monitor is configured to sense a second measurement value representing electrical current flow through the second self-compensating heater;
  wherein the computer-readable memory is further encoded with instructions that, when executed by the one or more processors, cause the system to:
    determine whether the first measurement value exceeds a second threshold deviation from the second measurement value;
    produce the icing condition signal to include an indication of a solid water icing condition in response to determining that the first measurement value exceeds the second threshold deviation from the second measurement value; and
    produce the icing condition signal to include an indication of a solid water icing condition in response to determining that the first measurement value exceeds the second threshold deviation from the second measurement value.

5. The system of claim 1, wherein the one or more parameters of expected electrical current flow through the first self-compensating heater comprise an expected electrical current draw.

6. The system of claim 1, wherein the one or more parameters of expected electrical current flow through the first self-compensating heater comprise an expected rate of change of electrical current draw.

7. The system of claim 1,
  wherein the device comprises an air data sensing probe; and
  wherein the first self-compensating heater is disposed in a probe head portion of the air data sensing probe.

8. The system of claim 7, wherein the second self-compensating heater is disposed in a strut portion of the air data sensing probe that extends between the probe head portion and a mounting plate configured to mount the air data probe to an aircraft exterior.

9. The system of claim 7, wherein the air data sensing probe comprises a total air temperature probe.

10. The system of claim 1, further comprising:
  one or more communication devices configured to send and receive data over an aircraft data bus;
  wherein the computer-readable memory is further encoded with instructions that, when executed by the one or more processors, cause the system to output the icing conditions signal over the aircraft data bus via the one or more communication devices.

11. A method comprising:
  receiving a first measurement value representing electrical current flow through a first self-compensating heater that heats a first surface of a device exposed to airflow about an exterior of an aircraft;
  receiving aircraft flight condition data; and
  producing an icing condition signal based upon the first measurement value and the aircraft flight condition data.

12. The method of claim 11, wherein producing the icing condition signal comprises producing the icing condition signal to include an indication of an amount of liquid water content of the airflow about the device.

13. The method according to claim 11, further comprising:
  determining one or more parameters of expected electrical current flow through the first self-compensating heater based on the received aircraft flight condition data; and
  determining whether the first measurement value exceeds a first threshold deviation from the one or more parameters of expected electrical current flow, wherein producing the icing condition signal based upon the first measurement value and the aircraft flight condition data is responsive to determining that the first measurement value exceeds the first threshold deviation from the one or more parameters of expected electrical current flow.

14. The method according to claim 13, further comprising:
  receiving a second measurement value representing electrical current flow through a second self-compensating heater that heats a second surface of the device exposed to the airflow about the exterior of the aircraft; and
  determining whether the first measurement value exceeds a second threshold deviation from the second measurement value;
  wherein producing the icing condition signal comprises:
    producing the icing condition signal to include an indication of a liquid water icing condition in response to determining that the first measurement value does not exceed the second threshold deviation from the second measurement value; and
    producing the icing condition signal to include an indication of a solid water icing condition in response to determining that the first measurement value exceeds the second threshold deviation from the second measurement value.

15. The method according to claim 11, wherein the one or more parameters of expected electrical current flow through the first self-compensating heater comprise an expected electrical current draw.

16. The method according to claim 11, wherein the one or more parameters of expected electrical current flow through the first self-compensating heater comprise an expected rate of change of electrical current draw.

17. The method according to claim 11, wherein the first self-compensating heater is disposed in a probe head portion of an air data sensing probe.

18. The method according to claim 17, wherein the second self-compensating heater is disposed in a strut portion of the air data sensing probe that extends between the probe head portion and a mounting plate configured to mount the air data probe to the exterior of the aircraft.

19. The method according to claim 17, wherein the air data sensing probe comprises a total air temperature probe.

20. The method according to claim 11, further comprising:
   outputting the icing conditions signal over an aircraft data bus.

* * * * *